US011512680B2

(12) United States Patent
Kjaer Blaabjerg et al.

(10) Patent No.: US 11,512,680 B2
(45) Date of Patent: Nov. 29, 2022

(54) LIFTING APPARATUS FOR AN OFFSHORE WIND TURBINE

(71) Applicant: Siemens Gamesa Renewable Energy A/S, Brande (DK)

(72) Inventors: Hans Kjaer Blaabjerg, Horsens (DK); Amandeep Gagein, Haryana (IN); Thomas Smedegaard, Åbyhøj (DK)

(73) Assignee: SIEMENS GAMESA RENEWABLE ENERGY A/S

(*) Notice: Subject to any disclaimer, the term of this patent is extended or adjusted under 35 U.S.C. 154(b) by 376 days.

(21) Appl. No.: 16/774,120

(22) Filed: Jan. 28, 2020

(65) Prior Publication Data

US 2020/0248675 A1 Aug. 6, 2020

(30) Foreign Application Priority Data

Jan. 31, 2019 (EP) .................................... 19154717

(51) Int. Cl.

*F03D 13/25* (2016.01)
*F03D 13/10* (2016.01)
*B66D 3/18* (2006.01)

(52) U.S. Cl.

CPC ............... *F03D 13/25* (2016.05); *B66D 3/18* (2013.01); *F03D 13/10* (2016.05)

(58) Field of Classification Search

CPC ............ F03D 13/25; F03D 13/10; B66D 3/18
See application file for complete search history.

(56) References Cited

U.S. PATENT DOCUMENTS 11,286,914 B2 * 3/2022 Christiansen ........... F03D 80/70
2011/0018269 A1 1/2011 Moser et al.
(Continued)

FOREIGN PATENT DOCUMENTS

CN 105697242 A 6/2016
CN 107324235 A 11/2017
(Continued)

OTHER PUBLICATIONS

Chinese Notice of Allowance for Application No. 202010078928.7, dated Aug. 11, 2021.
(Continued)

*Primary Examiner* — Aaron R Eastman
(74) *Attorney, Agent, or Firm* — Schmeiser, Olsen & Watts LLP

(57) ABSTRACT

An offshore wind turbine including a tower, a transition piece and a lifting apparatus for operating a lift inside the wind turbine is provided. The tower includes an inner platform at the bottom end of the tower. The transition piece includes a hang-off platform. The lifting apparatus includes a plurality of wires, a plurality of tensioners, one or more brackets attached to the inner platform and movable between at least a first operative configuration in which the plurality of tensioners are attached to the one or more brackets and the lift is movable from the first station at the inner platform towards the upper end of the tower, a second retracted configuration in which one or more brackets allows the lift to move between the first and the second station, the plurality of tensioners being attached to the hang-off platform.

8 Claims, 4 Drawing Sheets

(56) References Cited

U.S. PATENT DOCUMENTS

| | | | | |
|---|---|---|---|---|
| 2016/0195067 | A1* | 7/2016 | Mathiasen | F03D 13/20 52/745.18 |
| 2019/0309532 | A1* | 10/2019 | Buck | B66B 9/022 |
| 2021/0388822 | A1* | 12/2021 | Coloma Calvo | F03D 13/10 |

FOREIGN PATENT DOCUMENTS

| | | | | |
|---|---|---|---|---|
| CN | 207905991 | U | 9/2018 | |
| CN | 108862050 | A | 11/2018 | |
| DE | 102013107407 | A1 | 1/2015 | |
| EP | 3032097 | A1 | 6/2016 | |
| WO | 2010110329 | A1 | 9/2010 | |
| WO | WO-2020074526 | A1 * | 4/2020 | F03D 13/10 |

OTHER PUBLICATIONS

Wagner et al. “Alternative tower installations relieve steel towers”; Emeuerbare Energien Newsletter Pro; XP055189194; URL:http://www.tembra.com/tl_files/publications/alternative_turmeinbauten.pdf; 2011.

European Search Report and Written Opinion of the European Searching Authority dated Jul. 30, 2019 for Application No. 19154717.3.

* cited by examiner

LIFTING APPARATUS FOR AN OFFSHORE WIND TURBINE

CROSS-REFERENCE TO RELATED APPLICATIONS

This application claims priority to EP Application No. 19154717.3, having a filing date of Jan. 31, 2019, the entire contents of which are hereby incorporated by reference.

FIELD OF TECHNOLOGY

The following relates to an offshore wind turbine comprising a lifting apparatus for operating a lift inside the tower and the transition piece of the offshore wind turbine. The following further relates to a method of installing a lifting apparatus in an offshore wind turbine.

BACKGROUND

The tower of an offshore wind turbine may be equipped with a wire guided and wire driven lift system. Under special circumstances there may be the further need to extend the lift system from the tower further down into the transition piece, i.e. the component of the offshore wind turbine connecting the tower to a foundation pile. The current extension procedures are not optimized in terms of material costs and installation time, which also determines a considerable amount of labour costs.

Typically, lift systems in offshore wind turbine are equipped with a plurality of heavy pulleys, around which the wires of the lift system are wrapped. Such pulleys are attached to a lower surface of the low voltage platform, which is present inside the tower at the bottom end thereof. From the pulleys, the wires extend up to the top face of the low voltage platform. In presently known extension procedures, such pulleys are moved below to a hang-off platform provided in the transition piece. When tensioners are present, these also have to be moved from the low voltage platform of the tower to the hang-off platform in the transition piece.

The not-optimized costs mentioned above are particularly due to the presence and handling, in particular the removal from the low voltage platform and the displacement to the hang-off platform in the transition piece.

SUMMARY

An aspect relates to provide an optimized mechanical setup for the lifting apparatus of an offshore wind turbine, which can lead to a reduction in terms of time and costs, in particular during the procedure of extending the operability of the lifting apparatus in the transition piece.

According to a first aspect of embodiments of the present invention an assembly for an offshore wind turbine is provided. The assembly comprises:

- a tower extending axially along a longitudinal axis of the offshore wind turbine between an upper end of the tower and bottom end of the tower, longitudinally opposed to the upper end of the tower, the tower including an inner platform at the bottom end of the tower,
- a transition piece for connecting the tower to a foundation of the offshore wind turbine, the transition piece being attached to the bottom end of the tower, the transition piece comprising a hang-off platform longitudinally distanced from the inner platform,

- a lifting apparatus for operating a lift inside the tower and the transition piece along the longitudinal axis between a plurality of stations including at least a first station at the inner platform and a second station at the hang-off platform.

The lifting apparatus comprises:

- a plurality of wires for operating the lift between the plurality of stations,
- a plurality of tensioners attached to the plurality of wires for tensioning the plurality of wires,
- one or more brackets attached to the inner platform (20) and movable between at least:
- a first operative configuration in which the plurality of tensioners is attached to the one or more brackets and the lift is movable from the first station at the inner platform towards the upper end of the tower,
- a second retracted configuration in which one or more brackets allows the lift to move between the first and the second station, the plurality of tensioners being attached to the hang-off platform.

Advantageously, embodiments of the present invention permit to use configurable brackets instead of pulleys. The only items which need to be handled are the tensioners. The tensioners are moved from the platform at the bottom end of the tower to the hang-off platform in the transition piece.

According to embodiments of the present invention, the brackets are movable by rotation between the first operative configuration and the second retracted configuration.

When hinged flippable support brackets are folded down in the second retracted configuration, they stay clear of the lift passage.

According to a second aspect of embodiments of the present invention a method of installing a lifting apparatus for operating a lift inside the tower and the transition piece of an offshore wind turbine is provided. The method comprises the steps of:

- providing an inner platform at the bottom end of the tower including at least a first station for a lift,
- providing a hang-off platform inside the transition piece including at least a second station for the lift,
- providing a plurality of wires for operating the lift between the plurality of stations of the lifting apparatus,
- providing a plurality of tensioners for tensioning the plurality of wire,
- providing one or more brackets attached to the inner platform,
- moving the one or more brackets to a first operative configuration and attaching the plurality of tensioners to the one or more brackets in such a way that the lift is movable from the first station at the inner platform towards the upper end of the tower,
- removing the tensioners from the one or more brackets,
- attaching the tensioners to the hang-off platform and moving the one or more brackets to a second retracted configuration so that the one or more brackets allows the lift to move between the first and the second station.

Advantageously, the first steps of the above described method allow providing a lifting apparatus installed in the tower, which can move between the first station at the inner platform and another upper station, for example at the upper end of the tower or close to it. These may be conveniently performed during inshore harbour installations for building an assembly to be transported to the final offshore destination. According to embodiments of the present invention, such phase of the method may further comprise the steps of providing a passage for the lift at the inner platform and a removably attachable support for opening and closing said passage. The removable support is attached to the inner platform for closing the passage and supporting the lift when the one or more brackets are in the first operative configuration.

The last steps of the above described method allow to economically extending the listing apparatus in the transition piece, in particular once the assembly has reached its offshore final destination. This provides a lifting apparatus installed in the tower and in the transition piece, which can move between the second station at the hang-off platform and another upper station, for example the first station at the inner platform or another upper station at the upper end of the tower or close to it.

According to embodiments of the present invention, such phase of the method may further comprises removing the removable support from the inner platform for opening said passage and letting the lift pass through the passage when the one or more brackets are in the second retracted configuration.

BRIEF DESCRIPTION

Some of the embodiments will be described in detail, with reference to the following figures, wherein like designations denote like members, wherein.

DETAILED DESCRIPTION

Figure 1:
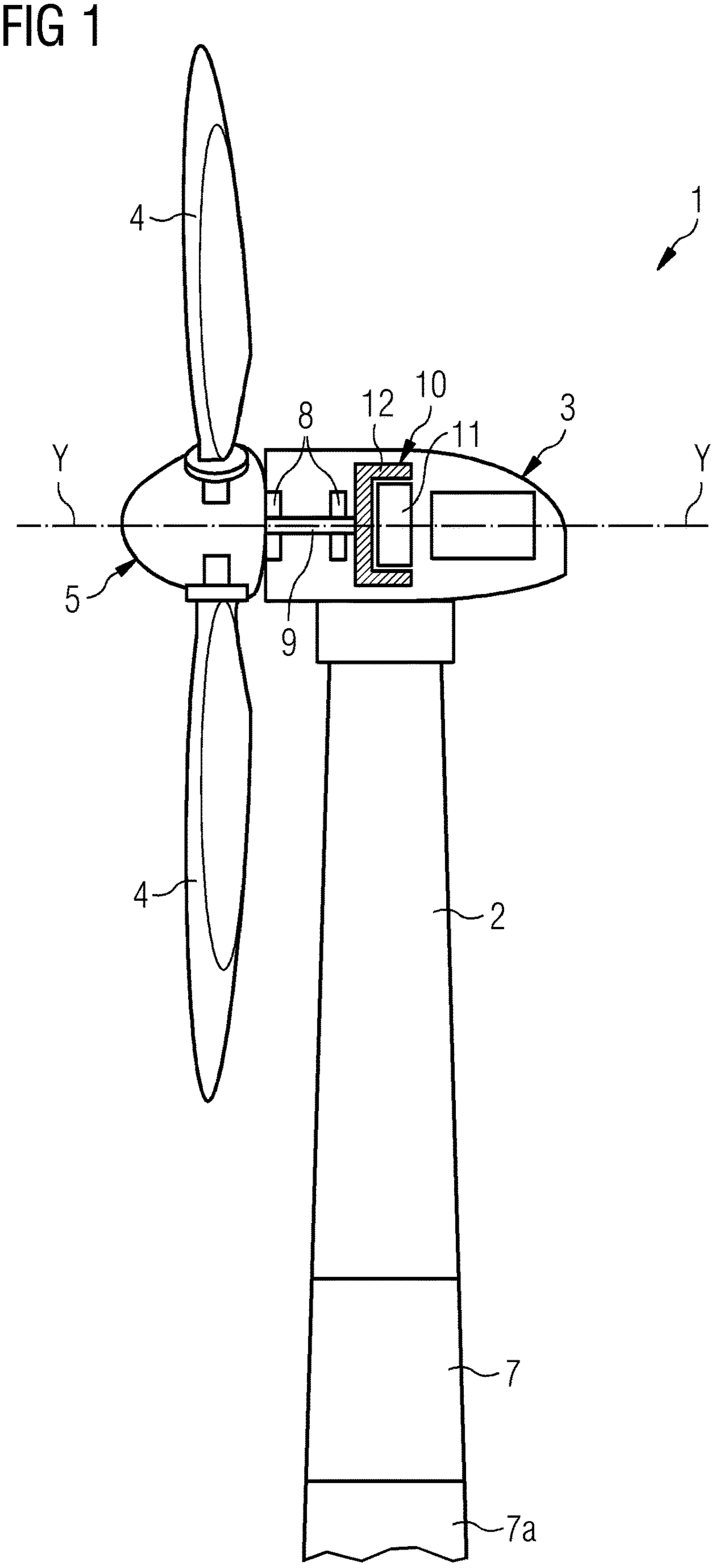
FIG. 1 shows a schematic section of an offshore wind turbine including a tower and a transition piece.

The illustrations in the drawings are schematically. It is noted that in different figures, similar or identical elements are provided with the same reference signs.

FIG. 1 shows an offshore wind turbine 1 according to embodiments of the invention. The wind turbine 1 comprises a tower 2, which is mounted on a pile foundation 7*a*. The tower 2 and the pile foundation 7*a* extend axially along a longitudinal axis Z of the offshore wind turbine 1.

A nacelle 3 is attached to an upper end of the tower 2. The wind turbine 1 further comprises a wind turbine rotor 5 having three blades 4 (in the perspective of FIG. 1 only two blades 4 are visible). The rotor 5 is attached to the nacelle 3 in order to be rotatable around a rotational axis Y.

The offshore wind turbine 1 comprises a transition piece 7 for connecting the tower 2 to the foundation 7*a*. The transition piece 7 is attached to the bottom end of the tower 2, longitudinally opposite to the upper end of the tower 2.

The wind turbine 1 comprises a concentrated winding electrical generator 10. The wind rotor 5 is rotationally coupled with the electrical generator 10 by means of a rotatable main shaft 9.

According to other possible embodiments of the present invention (not represented in the attached figures), the wind rotor 5 is rotationally coupled directly with the electrical generator 10 (direct-drive generator configuration).

A schematically depicted bearing assembly 8 is provided in order to hold in place the rotor 5. The rotatable main shaft 9 extends along the rotational axis Y. The permanent magnet electrical generator 10 includes a stator 11 and a rotor 12. The rotor 12 is radially external to the stator 11 and is rotatable with respect to the stator 11 about the rotational axis Y.

Figure 2:
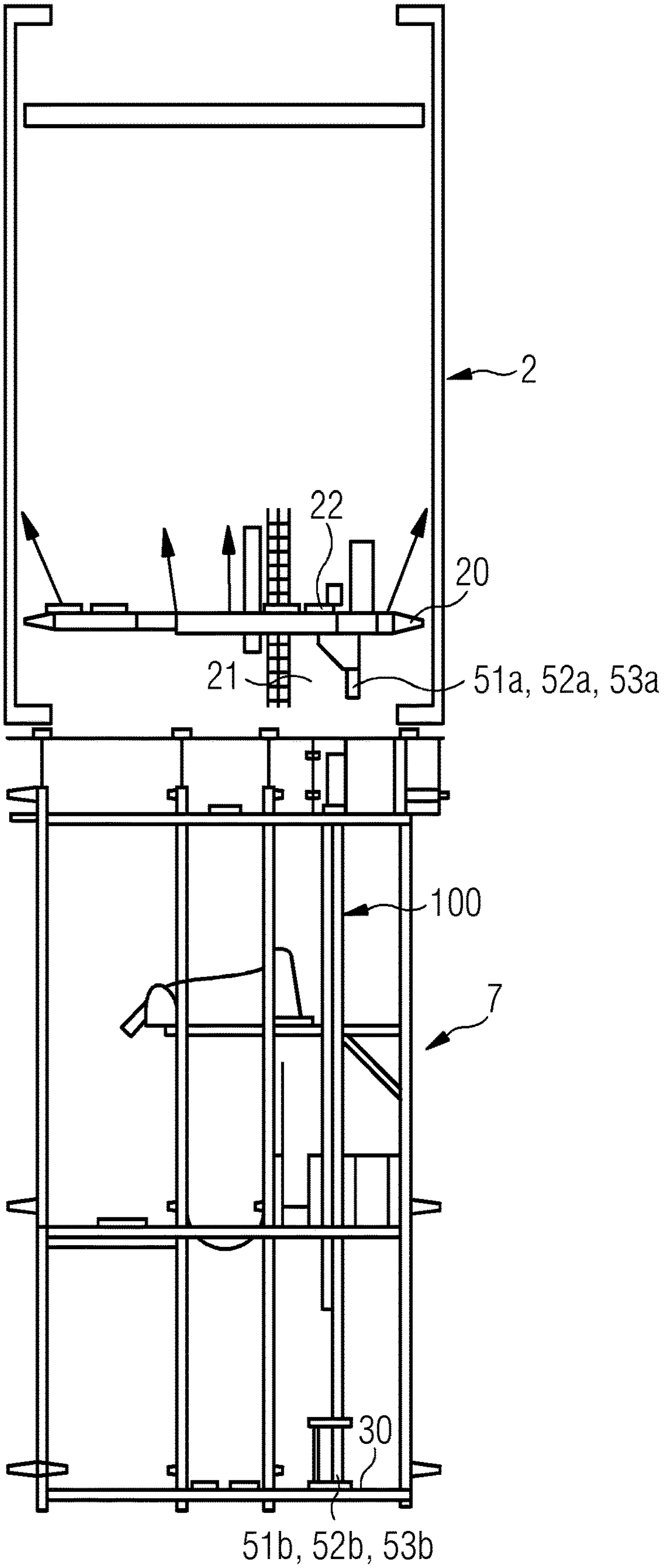
FIG. 2 shows a partial longitudinal section of an assembly for an offshore wind turbine including a tower, a transition piece and a lifting apparatus according to embodiments of the present invention.

FIG. 2 shows an assembly including the tower 2, the transition piece 7 and a lifting apparatus 100 for operating a lift inside the tower 2 and the transition piece 7. The lift, which is not represented in the attached figures, is conventional and therefore not described in further details.

The tower 2 includes an inner platform 20 at the bottom end of the tower 2. The transition piece is attached to the bottom end of the tower 2, below the inner platform 20. The transition piece 7 comprises a hang-off platform 30 longitudinally distanced from the inner platform 20.

The lifting apparatus 100 operates the lift inside the tower 2 and the transition piece 7 along the longitudinal axis Z between a plurality of stations including a first station at the inner platform 20 and a second station at the hang-off platform 30.

Figure 3:
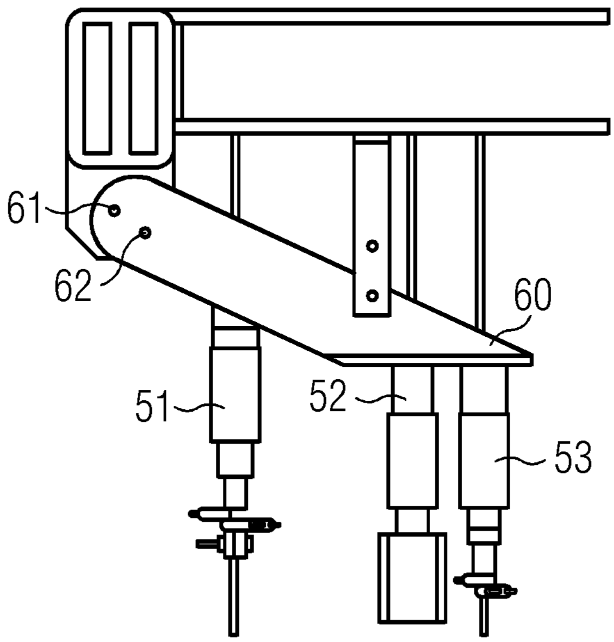
FIG. 3 shows a partial lateral view of the lifting apparatus of FIG. 2 in a first operative configuration.
Figure 4:
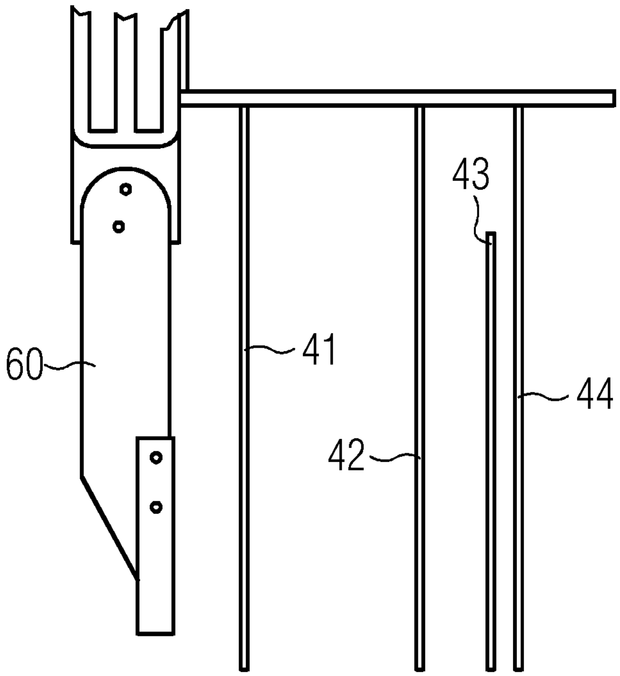
FIG. 4 shows a partial lateral view of the lifting apparatus of FIG. 2 in a second retracted configuration.
Figure 5:
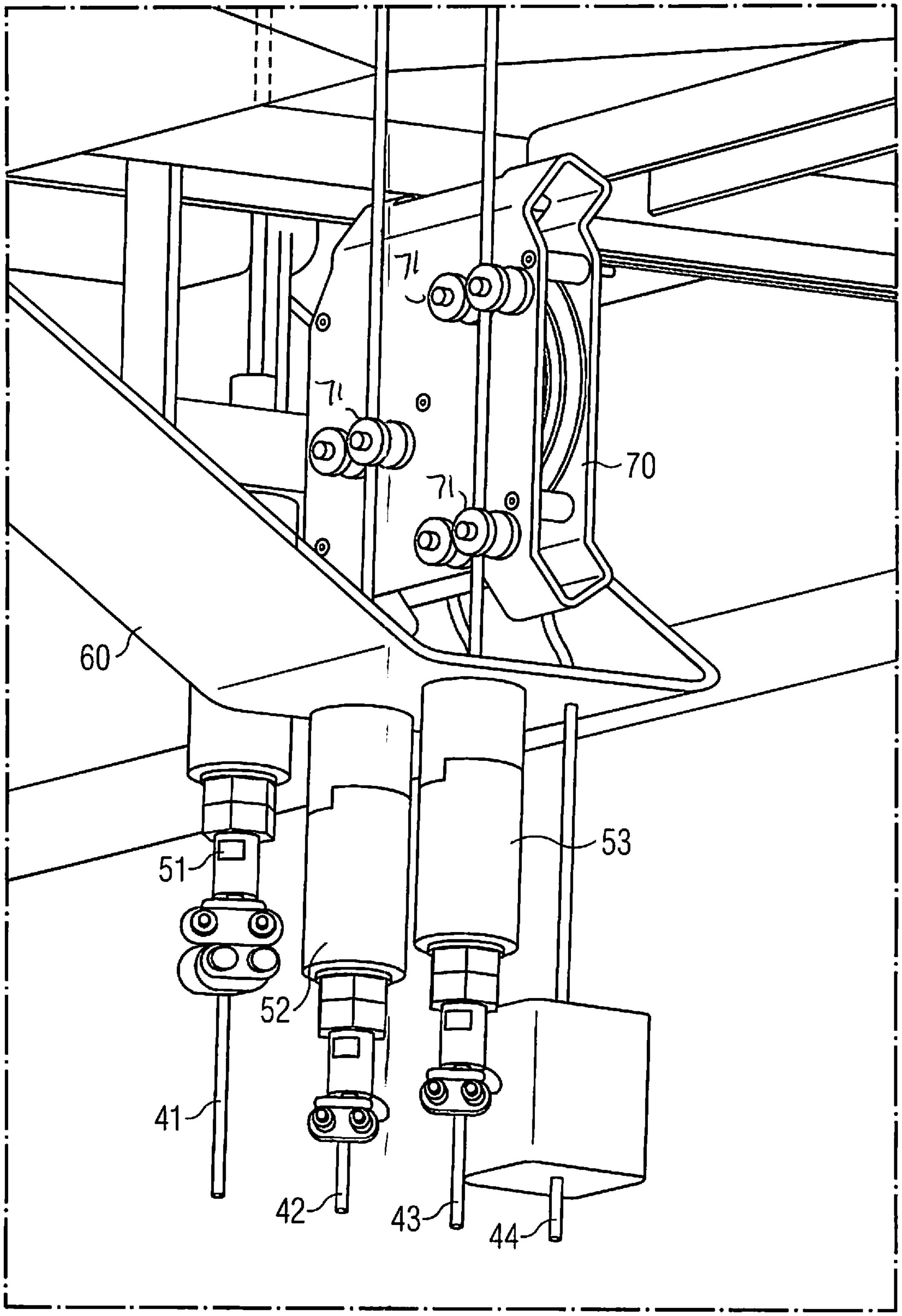
FIG. 5 shows another partial axonometric view of the lifting apparatus of FIG. 2.

FIGS. 3 to 5 show components of the lifting apparatus 100. The lifting apparatus 100 comprises a plurality of wires 41, 42, 43, 44 for operating the lift between the plurality of stations. The plurality of wires 41, 42, 43, 44 (four wires 41, 42, 43, 44 are shown in the attached figures) includes at least a traction wire, a security wire and a plurality of lift guiding wires.

The lifting apparatus 100 further includes a plurality of tensioners 51, 52, 53 (three tensioners are shown in the attached figures) attached to at least a portion of the plurality of wires 41, 42, 43, 44. The tensioners 51, 52, 53 provide a tension to the wires 41, 42, 43, 44 to which they are attached.

The lifting apparatus 100 further includes a bracket 60 attached to the inner platform 20 and rotatable about a hinge 61 between:

- a first operative configuration (FIG. 3) in which the plurality of tensioners 51, 52, 53 are attached to the bracket 60 and the lift is movable from the first station at the inner platform 20 towards the upper end of the tower 2.
- a second retracted configuration (FIG. 4) in which one or more brackets 60 allows the lift to move between the first and the second station, the plurality of tensioners 51, 52, 53 are attached to the hang-off platform 30.

In the second retracted configuration the bracket 60 is parallel to the longitudinal axis Z of the offshore wind turbine 1 and disposed in such a way to stay clear of the lift passage.

According to other embodiments of the present invention (not shown) more than one bracket 60 are provided, all movable between a first operative configuration and a second retracted configuration, as above defined.

According to other embodiments of the present invention (not shown) the bracket 60 is movable by translation between the first operative configuration and the second retracted configuration or can be simply removed from the hinge 61.

A method of installing the lifting apparatus 100 in the assembly comprising the tower 2 and the transition piece 7 are described in the following. The method comprises a first phase including the following steps of:

- providing the inner platform 20 at the bottom end of the tower 2 including the first station for a lift,
- providing the hang-off platform 30 inside the transition piece including at least a second station for the lift, providing the plurality of wires 41,42, 43, 44, providing the plurality of tensioners 51, 52, 53, providing the brackets 60 attached to the inner platform 20, rotating the bracket 60 to the first operative configuration and blocking the bracket 60 in the first operative configuration by means of a bolt 62 distanced from the hinge 61, attaching the plurality of tensioners 51, 52, 53 to the bracket 60 in such a way that the lift is movable from the first station at the inner platform 20 towards the upper end of the tower 2.

With reference to FIG. 2, the positions of the plurality of tensioners 51, 52, 53 attached to the bracket 60 is indicated with the reference numerals 51*a*, 52*a*, 53*a*. In this first phase, the method of installing the lifting apparatus 100 comprises the further steps of:

providing a passage 21 for the lift at the inner platform 20 and a removably attachable support 22 for opening and closing said passage 21, attaching the removably attachable support 22 to the inner platform 20 for closing said passage 21. In such a configuration, the support 22 supports the lift when the bracket 60 is in the first operative configuration.

In this first phase, the method of installing the lifting apparatus 100 comprises the further step of providing a travel cable pulley 70 for guiding at least a portion of the plurality of wires 41, 42, 43, 44, the travel cable pulley 70 being comprised between the inner platform 20 at the bottom end of the tower 2 and the bracket 60 when the bracket 60 is in the first operative configuration and the lift is at the first station. The pulley 70 follows the lift running at a predefined distance under the lift cabin. This makes sure that the power supply cable is moving in a controlled manner when the lift is in operation. The pulley 70 is therefore always intermediate between the lift and the plurality of tensioners 51, 52, 53.

At least a portion of the plurality of wires 41, 42, 43, 44 is guided by rollers 71 provided on an external surface of the pulley 70. Alternatively, the wires 41, 42, 43, 44 may be guided through bushings (not shown in the attached figures).

The first phase is performed at an inshore harbour and provides a lift apparatus for operating a lift inside the tower up to the lower first station at the inner platform 20.

At an offshore location, the method comprises a second phase of extending the operability of the lift in the transition piece 7. The second phase includes the following steps of:

removing the tensioners 51, 52, 53 from the one or more brackets 60, attaching the tensioners 51, 52, 53 to the hang-off platform 30 and moving the bracket 60 to a second retracted configuration so that the brackets 60 allows the lift to move between the first and the second station.

removing the removable support 22 from the inner platform 20 for opening the passage 21 and letting the lift pass through the passage 21.

With reference to FIG. 2, the positions of the plurality of tensioners 51, 52, 53 attached to the hang-off platform 30 is indicated with the reference numerals 51*b*, 52*b*, 53*b*.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. An assembly for an offshore wind turbine comprising:

a tower extending axially along a longitudinal axis of the offshore wind turbine between an upper end of the tower and bottom end of the tower, longitudinally opposed to the upper end of the tower, the tower including an inner platform at the bottom end of the tower, a transition piece for connecting the tower to a foundation of the offshore wind turbine, the transition piece being attached to the bottom end of the tower, the transition piece comprising a hang-off platform longitudinally distanced from the inner platform, a lifting apparatus for operating a lift inside the tower and the transition piece along the longitudinal axis between a plurality of stations including at least a first station at the inner platform and a second station at the hang-off platform, wherein the lifting apparatus comprises:

a plurality of wires for operating the lift between the plurality of stations, a plurality of tensioners attached to the plurality of wires for tensioning the plurality of wires, one or more brackets attached to the inner platform and movable between at least:

a first operative configuration in which the plurality of tensioners are attached to the one or more brackets and the lift is movable from the first station at the inner platform towards the upper end of the tower;

a second retracted configuration in which one or more brackets allows the lift to move between the first and the second station, the plurality of tensioners being attached to the hang-off platform; and wherein the offshore wind turbine further includes a travel cable pulley moving along the longitudinal axis together with the lift for guiding at least a portion of the plurality of wires, the travel cable pulley being comprised between the inner platform at the bottom end of the tower and the one or more brackets when the one or more brackets are in the first operative configuration and the lift is in the first station at the inner platform.

2. The assembly for an offshore wind turbine according to claim 1, wherein the one or more brackets are rotatable between the first operative configuration and the second retracted configuration.

3. The assembly for an offshore wind turbine according to claim 1, wherein plurality of wires includes at least a traction wire, a security wire and a lift guiding wire.

4. An offshore wind turbine including the assembly according to claim 1.

5. An assembly for an offshore wind turbine comprising:

a tower extending axially along a longitudinal axis of the offshore wind turbine between an upper end of the tower and bottom end of the tower, longitudinally opposed to the upper end of the tower, the tower including an inner platform at the bottom end of the tower, a transition piece for connecting the tower to a foundation of the offshore wind turbine, the transition piece being attached to the bottom end of the tower, the transition piece comprising a hang-off platform longitudinally distanced from the inner platform, a lifting apparatus for operating a lift inside the tower and the transition piece along the longitudinal axis between a plurality of stations including at least a first station at the inner platform and a second station at the hang-off platform, wherein the lifting apparatus comprises:

a plurality of wires for operating the lift between the plurality of stations, a plurality of tensioners attached to the plurality of wires for tensioning the plurality of wires, one or more brackets attached to the inner platform and movable between at least:

a first operative configuration in which the plurality of tensioners are attached to the one or more brackets and the lift is movable from the first station at the inner platform towards the upper end of the tower;

a second retracted configuration in which one or more brackets allows the lift to move between the first and the second station, the plurality of tensioners being attached to the hang-off platform; and wherein the inner platform at the bottom end of the tower includes a passage and a removably attachable support of opening and closing said passage, the removably attachable support being attachable to the inner platform for closing said passage and supporting the lift when the one or more brackets are in the first operative configuration, the removably attachable support being removable for opening said passage and let the lift pass through the passage when the one or more brackets are in the second retracted configuration.

6. A method of installing a lifting apparatus for operating a lift inside a tower and a transition piece of an offshore wind turbine extending axially along a longitudinal axis comprising the steps of:

providing an inner platform at the bottom end of the tower including at least a first station for a lift, providing a hang-off platform inside the transition piece including at least a second station for the lift, providing a plurality of wires for operating the lift between a plurality of stations of the lifting apparatus, providing a plurality of tensioners for tensioning the plurality of wires, providing one or more brackets attached to the inner platform, moving the one or more brackets to a first operative configuration and attaching the plurality of tensioners to the one or more brackets in such a way that the lift is movable from the first station at the inner platform towards the upper end of the tower, removing the tensioners from the one or more brackets, and attaching the tensioners to the hang-off platform and moving the one or more brackets to a second retracted configuration so that the one or more brackets allows the lift to move between the first and the second station.

7. The method according to claim 6, wherein the method comprises the further step of providing a passage for the lift at the inner platform and a removably attachable support for opening and closing said passage, the method comprising the steps of:

attaching the removably attachable support to the inner platform for closing said passage and supporting the lift when the one or more brackets are in the first operative configuration, and removing the removably attachable support from the inner platform for opening said passage and letting the lift pass through the passage when the one or more brackets are in the second retracted configuration.

8. The method according to claim 6, wherein the steps of:

removing the tensioners from the one or more brackets, and attaching the tensioners to the hang-off platform and moving the one or more brackets to a second retracted configuration so that the one or more brackets allows the lift to move between the first and the second station, are performed offshore.

* * * * *